US008233163B2

(12) United States Patent
Ito

(10) Patent No.: US 8,233,163 B2
(45) Date of Patent: Jul. 31, 2012

(54) IMAGE FORMING APPARATUS AND DATA PROCESSING METHOD

(75) Inventor: Shuichi Ito, Akishima (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 724 days.

(21) Appl. No.: 12/195,548

(22) Filed: Aug. 21, 2008

(65) Prior Publication Data

US 2009/0086241 A1 Apr. 2, 2009

(30) Foreign Application Priority Data

Sep. 28, 2007 (JP) ................................ 2007-253697

(51) Int. Cl.
*G06F 3/12* (2006.01)
*G06K 15/00* (2006.01)

(52) U.S. Cl. ..................................... 358/1.13; 358/1.18

(58) Field of Classification Search .................. 358/1.13
See application file for complete search history.

(56) References Cited

U.S. PATENT DOCUMENTS

2003/0231325 A1* 12/2003 Kubo ............................ 358/1.9
2005/0270552 A1* 12/2005 Sakamoto .................... 358/1.13
2007/0070472 A1* 3/2007 Kato et al. .................... 358/537
2008/0062460 A1* 3/2008 Yamada ....................... 358/1.15

FOREIGN PATENT DOCUMENTS

JP 2004-312534 A 11/2004

* cited by examiner

*Primary Examiner* — Mark K Zimmerman
*Assistant Examiner* — Mesfin Getaneh
(74) *Attorney, Agent, or Firm* — Holtz, Holtz, Goodman & Chick, PC

(57) ABSTRACT

An image forming apparatus including: an image processing section which creates print data to be outputted out of complex original document data including both character data and diagram data in a single page of data; and an image forming section which outputs the created print data onto a sheet, wherein the image processing section determines divided character data and divided diagram data in the complex original document data, to be outputted; creates character print data by enlarging the divided character data and attaching position information in the complex original document data; creates diagram print data by enlarging the divided diagram data and attaching position information in the complex original document data; and creates position information attached print data in which the position information of the divided character data and the divided diagram data are attached to the complex original document data.

12 Claims, 13 Drawing Sheets

IMAGE FORMING APPARATUS AND DATA PROCESSING METHOD

CROSS REFERENCE TO RELATED APPLICATION

The present application is based on Japanese Patent Application No. 2007-253697 filed with Japanese Patent Office on Sep. 28, 2007, the entire content of which is hereby incorporated by reference.

BACKGROUND OF THE INVENTION

1. Technical Field

Present invention relates to an image forming apparatus for outputting print data generated by an image processing section, and to a data processing method.

2. Description of Prior Art

In recent years, image forming apparatuses such as copying machines and printers are capable of outputting images on sheets with variable modes as required by users. For example, in cases where character data is included in original document data read-in through a scanner or received from another terminal, there may be cases where the character area is enlarged and outputted on a sheet.

In Japanese Patent Application Publication No. 2004-312534, described is the technology that only in cases where a font size in the character area included in image data is smaller than the font size required by a user, the image data is enlarged and an appropriate image is formed on a sheet based on the enlarged image data. According to such the technology, even an elderly person can easily recognize the character included in the image.

In a case of enlarging and outputting the image data on a sheet, the enlarged image may be divided and outputted on a plurality of sheets. With respect to the image data where both character data and diagram data (data of diagram and/or table) are included in the original document data of a single sheet, in the case of dividing, enlarging and outputting the character data and the diagram data on a plurality of sheets, it is difficult to exactly determine where the divided character or diagram correspond to the portion of the original document data. Regarding the character data, it is especially difficult.

In view of the foregoing, it is required to provide an image forming apparatus and a data processing method that enable the user to easily determine the positional relationship between the character or diagram images, which have been divided and printed on a plurality of sheets, and the original document data.

SUMMARY

An image forming apparatus reflecting one aspect of the present invention includes:

an image processing section which creates print data to be outputted out of complex original document data including both character data and diagram data in a single page of data; and an image forming section which outputs the print data created by the image processing section onto a sheet, wherein the image processing section determines divided character data and divided diagram data in the complex original document data, to be outputted onto a plurality of sheets;

creates character print data by enlarging the divided character data and by attaching position information of the divided character data in the complex original document data;

creates diagram print data by enlarging the divided diagram data and by attaching position information of the divided diagram data in the complex original document data; and creates position information attached print data in which the position information of the divided character data and the position information of the divided diagram data are attached to the complex original document data.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

Figure 1:
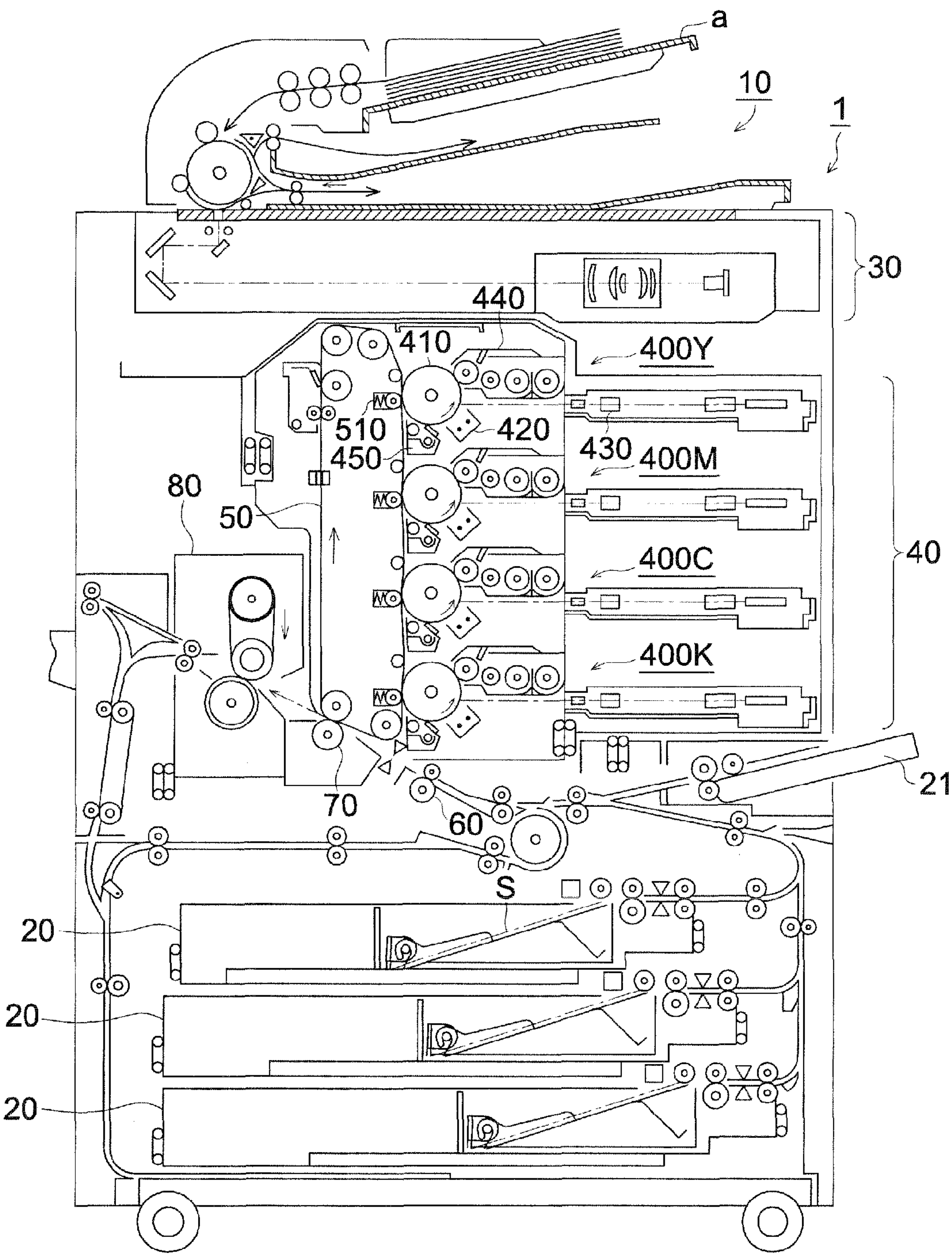
FIG. 1 is a central section view showing the internal configuration of an image forming apparatus.

FIG. 1 is a central section view showing the internal configuration of an image forming apparatus.

Image forming apparatus 1 is a color image forming apparatus of tandem system provided with intermediate transfer belt 50.

An original document placed on original document platen a of automatic double-side document feeder 10, is conveyed by various rollers to image reading section 30.

The image forming apparatus 1 is equipped, in the lower part, with plural sheet containers 20.

Above the sheet containers 20, image forming section 40 and intermediate transfer belt 50 are provided, and on the upper part of the apparatus main body, image reading section 30 is provided.

Sheet containers 20 are configured to be retractable to the front side of the apparatus (front side of the paper sheet on which FIG. 1 is drawn). In the plural sheet containers 20, sheets S such as white paper sheets classified with size are loaded. Sheets S loaded in sheet containers 20 are fed one by one by a feed roller. Into manual feeding section 21, special sheets such as OHP (Over Head Projector) sheets are loaded.

Image forming section 40 is provided with four sets of image forming engine 400Y, 400M, 400C and 400K for forming toner images of each color Y, M, C, and K. Image forming engines 400Y, 400M, 400C, and 400K are linearly arranged in this order from top to bottom direction, each engine having the same structure. Here, the structure will be described taking, as an example, image forming engine 400Y for yellow color. Image forming engine 400Y has photoreceptor 410 rotating counterclockwise, charging section 420, exposing section 430 and developing section 440.

Cleaning section 450 is provided in the area including the position opposing the bottommost part of photoreceptor 410.

Intermediate transfer belt 50 positioned at the central part of the apparatus is endless type and has predetermined electric volume resistivity. First transfer electrode 510 is provided at the position opposing photoreceptor 410 with sandwiching intermediate transfer belt 50.

Next, an image forming method for forming color images will be described.

Photoreceptor 410 is driven to rotate by a motor (not illustrated), and charged in negative polarity (for example to −800V) by discharge from charging section 420. Next, exposing section 430 writes-in onto photoreceptor 410 with a light beam in accordance with image information to form an electrostatic latent image. While the formed electrostatic latent image passes through developing section 440, in the developing section the toner charged in negative polarity attaches to the latent image area by application of negative developing bias voltage, thus a toner image is formed on photoreceptor 410. The formed toner image is transferred onto intermediate transfer belt 50 coming in pressure contact to photoreceptor 410. Toner remained after the transfer on photoreceptor 410 is cleaned by cleaning section 450.

Toner images having been formed by each image forming engine 400Y, 400M, 400C and 400K are transferred with being superimposed onto intermediate transfer belt 50 to form a color image on intermediate transfer belt 50. Sheet S is fed one by one from sheet container 20, and is conveyed to the position of registration roller 60 which functions as a registration conveyance section. Sheet S hits registration roller 60 and temporarily stops to correct the skew of sheet S. After that, sheet S is fed from registration roller 60 at the timing with which an imaging position on sheet S coincides with the toner image on intermediate transfer belt 50.

Sheet S fed by registration roller 60 is guided by a guide plate and sent to a transfer nip position formed by intermediate transfer belt 50 and transfer section 70. Transfer section 70, which is configured with a roller, presses sheet S to intermediate transfer belt 50. By application of bias voltage of reverse polarity to the toner charge (for example, +500V) onto transfer section 70, the toner image on intermediate transfer belt 50 is transferred onto sheet S by the effect of electrostatic force. Sheet S is separated from intermediate transfer belt 50 by a separation unit (not illustrated) configured with discharging needles and sent to fixing section 80 configured with a pair of rollers including a heating roller and a pressure roller. As the result, the toner image is fixed on sheet s, and sheet S on which the image have been formed is ejected.

Although, image forming apparatus 1 in the present embodiment is the apparatus which forms a color image on a sheet with an electrophotographic method, the image forming apparatus pertaining to the present invention is not restricted to the present embodiment, but naturally includes an image forming apparatus exclusive to monochrome image which forms a monochrome image on a sheet, further any other image forming system than the electrophotographic system such as inkjet system, thermal transfer system and silver halide photographic system can be utilized.

Figure 2:
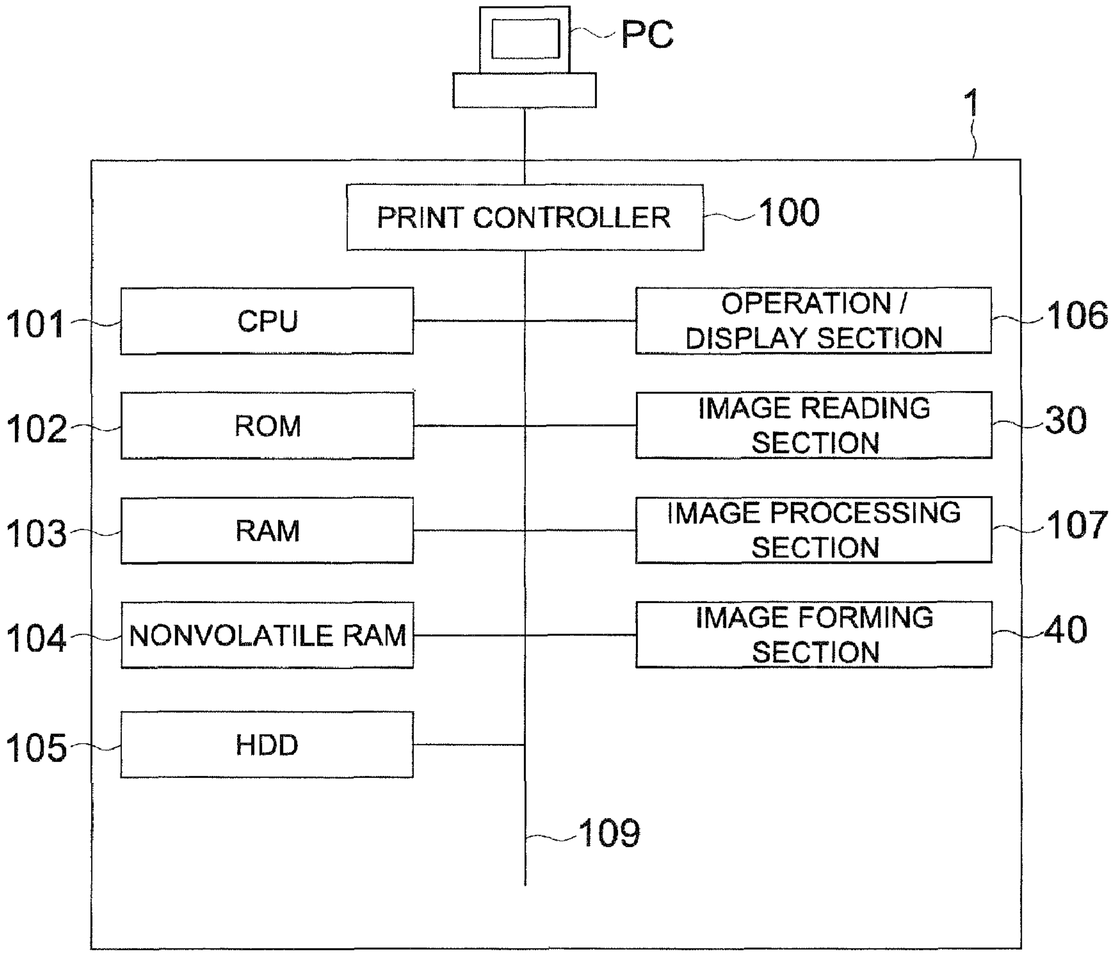
FIG. 2 is a block diagram of a control system of the image forming apparatus.

FIG. 2 is a block diagram showing the control system of image forming apparatus 1, where only major units are illustrated.

CPU (Central Processing Unit) 101 is connected via system bus 109 to ROM (Read Only Memory) 102 and RAM (Random Access Memory) 103 etc. CPU 101 reads out various kind of programs stored in ROM 102 and expands them on RAM 103 to control the operation of each section. Further, CPU 101 executes various processing based on the program expanded on RAM 103 and stores the processing results into RAM 103 as well as displaying on operation/display section 105. And CPU 101 controls to save the processing results stored in RAM 103 into prescribed storage destination.

ROM 102 is typically structured with a solid-state memory, and previously has stored with programs and data etc.

RAM 103 forms a work area to temporarily store the data etc. processed by various programs executed by CPU 101.

Nonvolatile RAM 104 temporarily stores the processed data etc., which is not erased even when the power of the image forming apparatus is shut down.

HDD 105 has functions of storing the original document data obtained by reading with image reading section 30, or storing the image data etc., which having been outputted. HDD105 has a structured in which several metal discs coated or evaporated with magnetic material are piled with certain spaces. The magnetic discs are rotated in high speed, and a magnetic head comes close to the discs to read or write data.

Operation/display section 106 enables various settings. Operation/display section 106 is, for example, configured to be a touch panel system, and by user's input through operation/display section various conditions are set with respect to color printing or monochrome printing. Further, various chips of information such as information of network setting are displayed on operation/display section 106. In the case of executing the divided print mode, which will be described later, onto the original document data read by image reading section 30, settings of the print mode is conducted through operation/display section 106.

Image reading section 30 optically reads out an original document image, and converts into electrical signals. In the case of reading out a color original document, image reading section 30 generates original data containing brightness information of 10 bits for each of RGB per one pixel.

The original document data generated by image reading section 30 and/or the original document data transmitted from the PC connected to image forming apparatus 1 are processed by image processing section 107 to generate the print data to be outputted. In the case of executing a color printing in image forming apparatus 1, the image data R(Red)·G(Green)·B (Blue) which are generated by image reading section 30 etc. are inputted into color conversion LUT in image processing section 107, and R·G·B data are converted into (Yellow)·M (Magenta)·C(Cyan)·B(Black) image data. After that, several image processing are applied on the color converted image data, such as correction of gradation reproduction characteristic, screen processing with referring to density correction LUT, and edge processing for enhancing a fine line.

Image forming section 40 receives the image data processed by image processing section 107 and forms an image on a sheet.

Next, the divided print mode, which is executed by image forming apparatus 1, will be described. The divided print mode is a mode where with respect to the data containing character data and diagram data (data of diagram and/or table) in one page of original document data (this type of data is referred to as "complex original document data") read out by image reading section 30 or sent from the PC, the character data or the diagram data are divided, enlarged and printed on multiple sheets.

Figure 3:
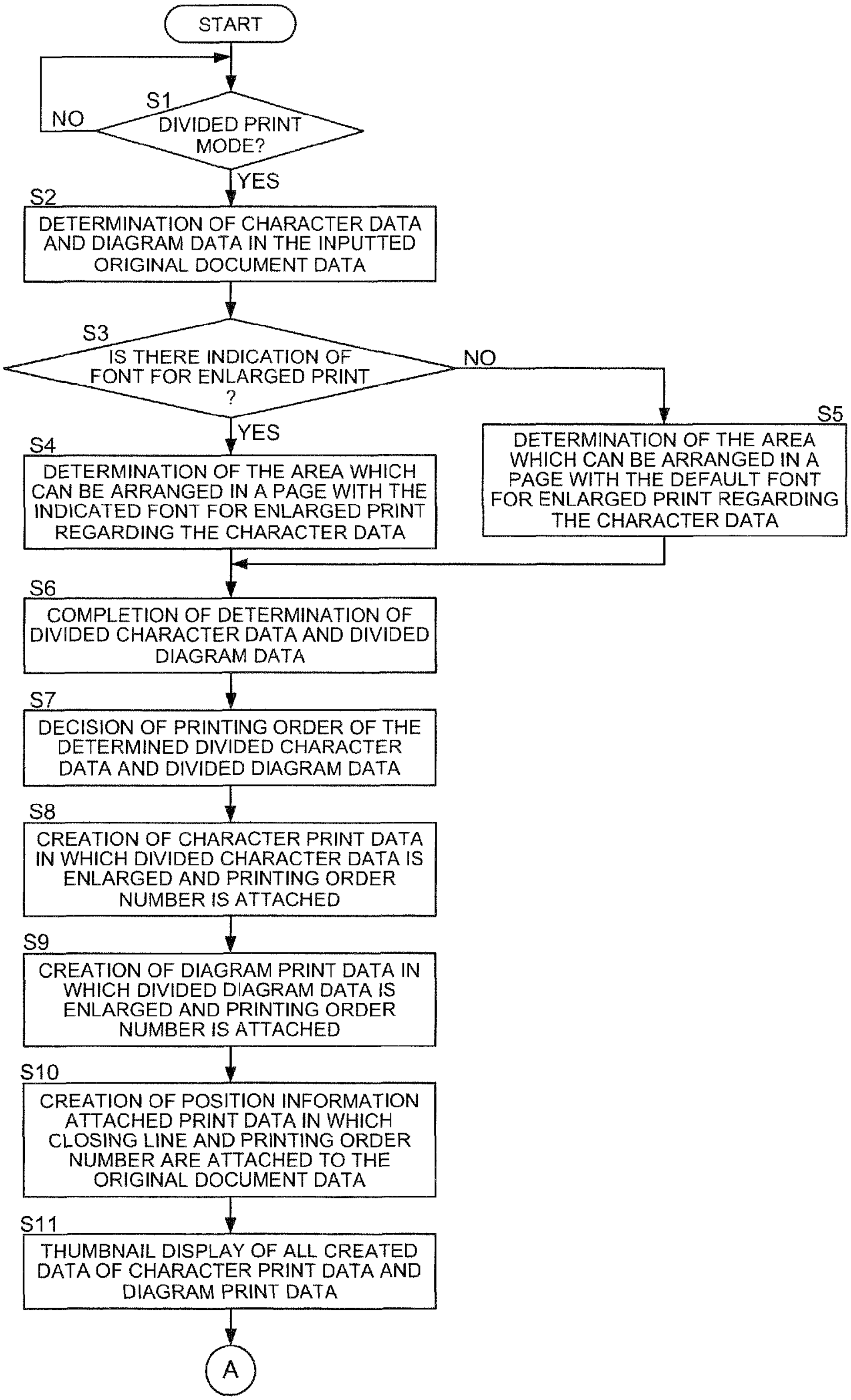
FIG. 3 is a flow chart showing an operation relating a divided print mode.
Figure 4:
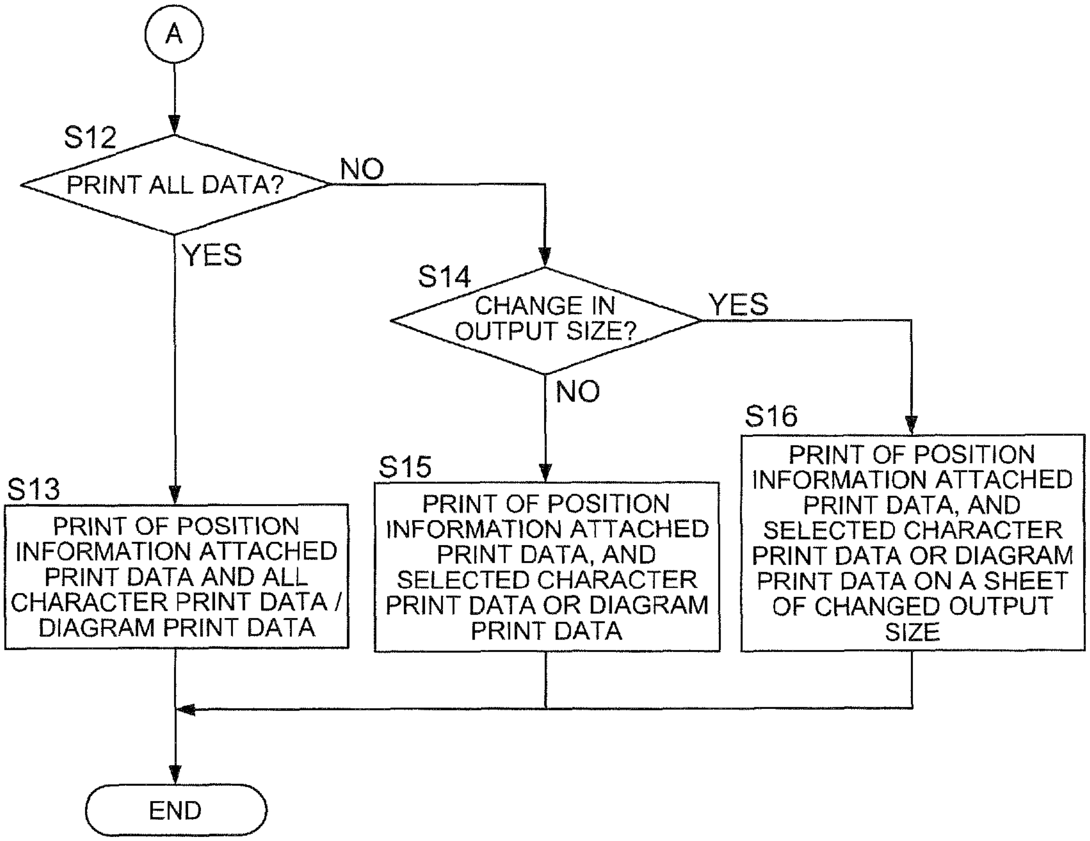
FIG. 4 is a flow chart showing an operation relating a divided print mode.

FIGS. 3 and 4 are flow charts showing operations relating to the divided print mode.

First of all, based on the setting contents in operation/display section 106 and/or print job setting information sent from the PC, it is determined whether or not the divided print mode is set (Step S1). The operation of Step S1 is executed by CPU 101 based on a prescribed program in cooperation with ROM 102 etc.

In cases where the divided print mode is determined to have been set, the character data and the diagram data are discriminated out of the complex original document data inputted into image forming apparatus 1 (Step S2). For example, in the complex original document data shown in FIG. 5, the area of D1 is determined to be character data, and the areas D2 and D3 are determine as diagram data.

Figure 5:
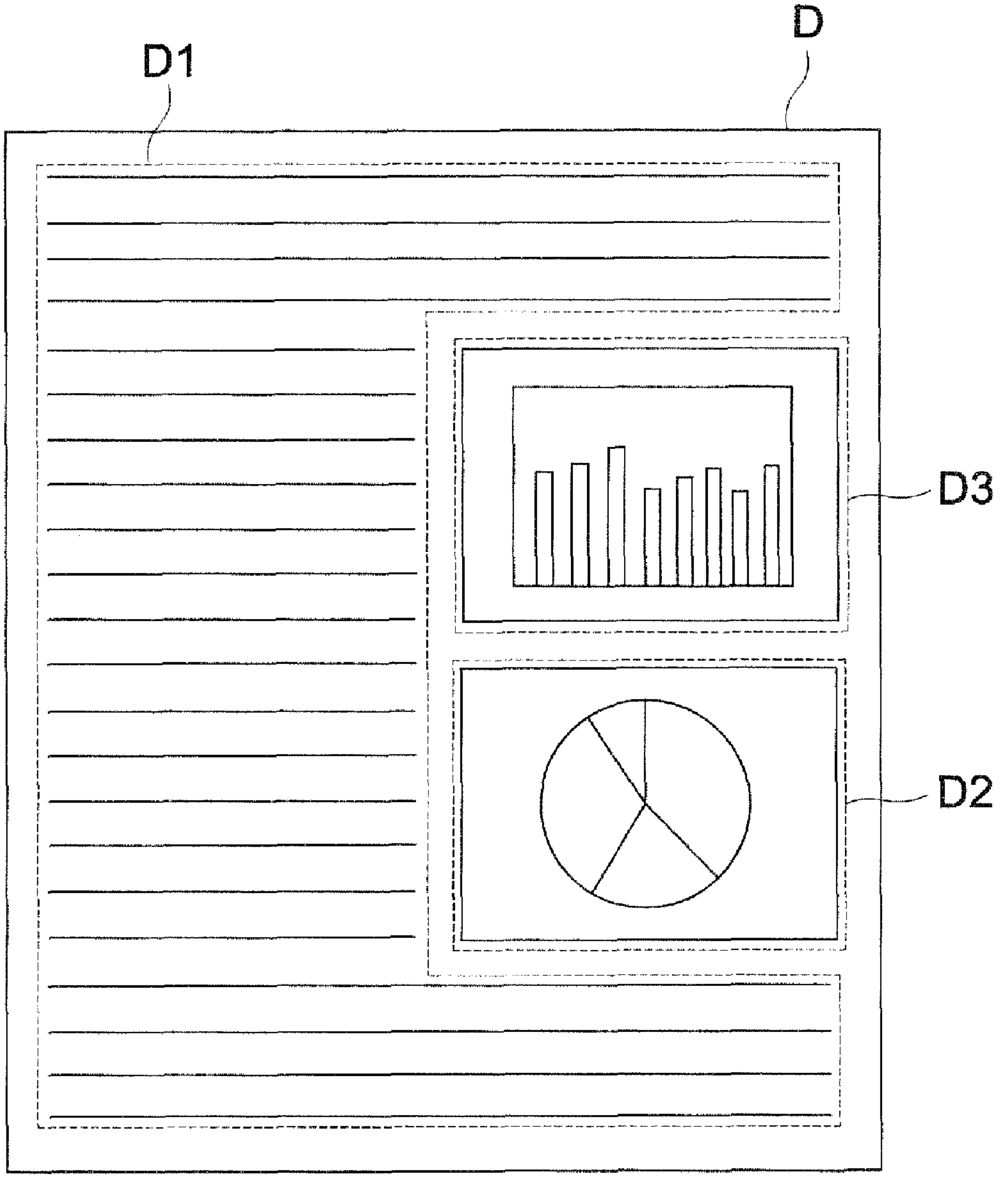
FIG. 5 is a schematic diagram showing complex original document data.

Next, determined is whether an indication of any font for enlarged print with regard to enlarged printing of character data on a sheet (Step S3). For example, determines whether there is an indication of character size for the enlarged print font. In cases where there is the indication of a font for the enlarged print, determined is the data area which can be arranged in one page of sheet with the indicated font for enlarged print regarding the character data. In cases where there is not the indication of the font for the enlarged print, determined is the data area which can be arranged in one page of sheet with the default font for enlarged print regarding the character data. In the example of FIG. 5, regarding the character data D1, the data areas which can be arranged in one page of sheet are, for example, D1A area and D1B area shown in FIG. 6.

Figure 6:
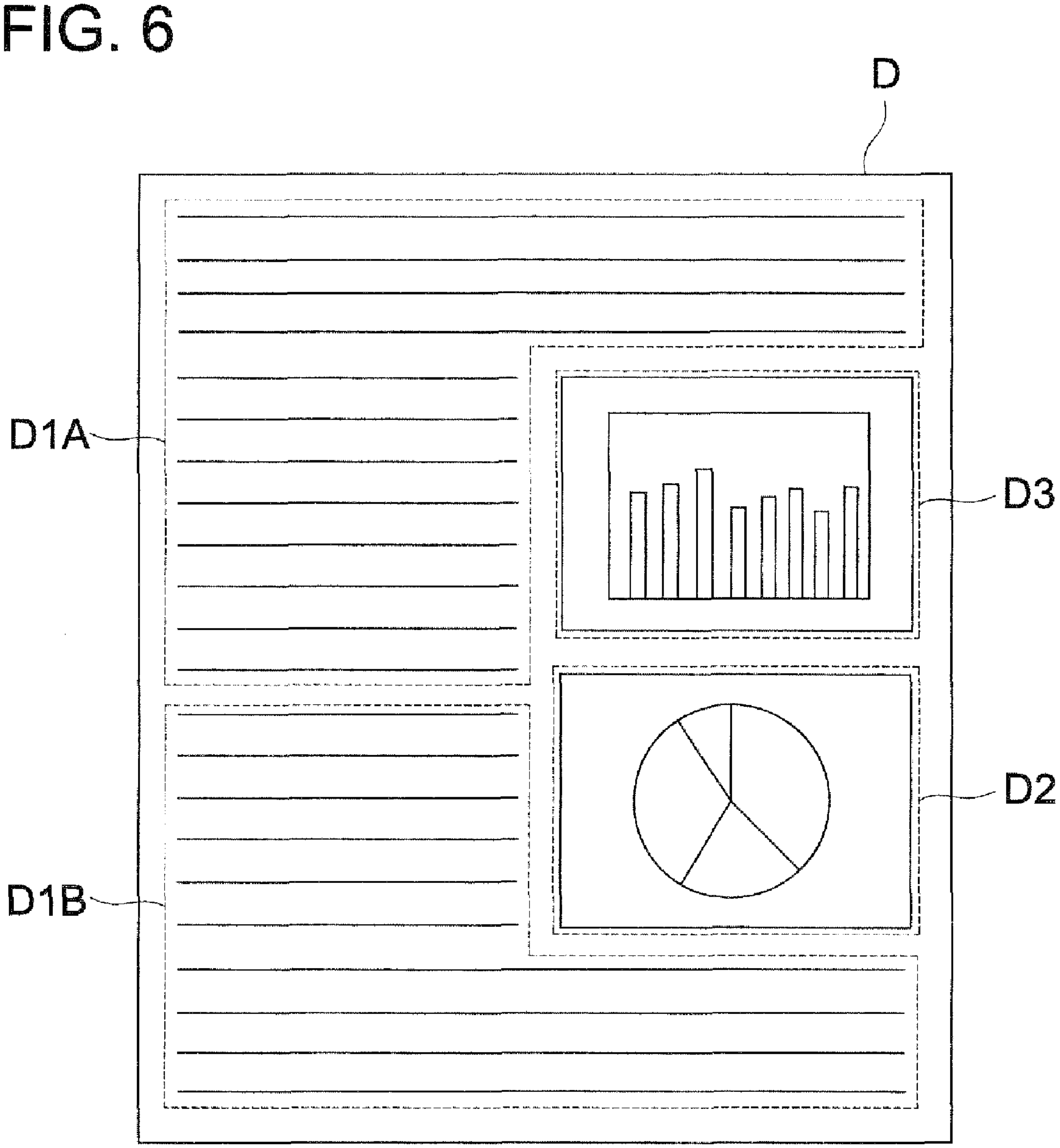
FIG. 6 is a schematic diagram showing complex original document data where divided character data and divided diagram data are determined.

Thereafter, regarding the complex original document data, the determination of the divided character data and the divided diagram data, which are to be divided and printed on multiple sheets, is completed (Step S6). In the example of FIG. 6, the character data D1 is arranged in two areas of D1A and D1B, and divided diagram data is arranged in two areas of D2 and D3, and each data is to be enlarged and outputted (printed) on the sheet.

After completion of divided data determination, printing order of the determined divided character data and divided diagram data are determined (Step S7) In the example shown in FIG. 6, determined is, for example, that the divided character data D1A is firstly printed, the divided character data D1B is secondly printed, the divided diagram data D2 is thirdly printed and the divided diagram data D3 is fourthly printed.

Next, based on the printing order determined in Step S7, print data to be outputted on the sheet in Steps S8-S10 are formed by image processing section 107.

In Step S8, the divided character data is enlarged and the character print data attached with the number of print order determined in Step S 7 is formed. And in Step S9, the divided diagram data is enlarged and the diagram print data attached with the number of print order determined in Step S 7 is formed. Herein, number information of the printing order, is made different between each of the character print data and the diagram print data.

Figure 7:
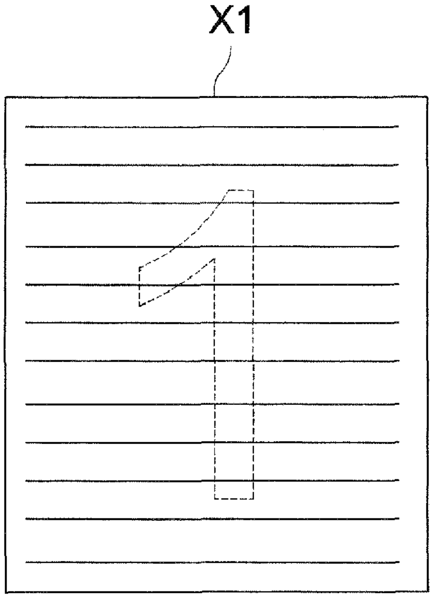
FIGS. 7(*a*)-(*d*) are schematic diagrams showing examples of character print data and diagram print data.
Figure 7:
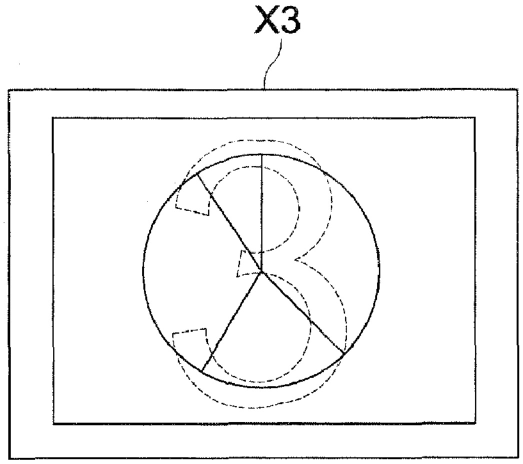
Figure 7:
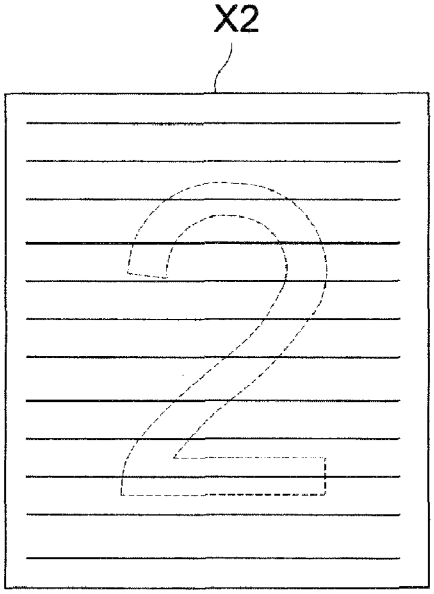
Figure 7:
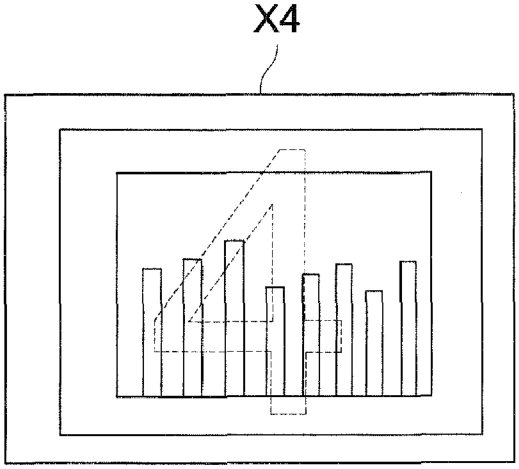

In FIG. 7, examples of character print data and diagram print data are shown.

Among the original document data D shown in FIG. 6, since divided character data D1A is firstly printed, on character print data X1 which is based on divided character data D1A, attached is the number of printing order "1" as shown in FIG. 7(*a*). This number of printing order is reproduced in low density when outputted on the sheet. Further, since divided diagram data D2 is thirdly printed, on diagram print data X3 which is based on divided diagram data D2, attached is the number of printing order "3" as shown in FIG. 7(*c*).

After the creation of the character print data and the diagram print data, in Step S 10 position information attached print data is created in which a closing line and a printing order number are attached to the original document data.

Figure 8:
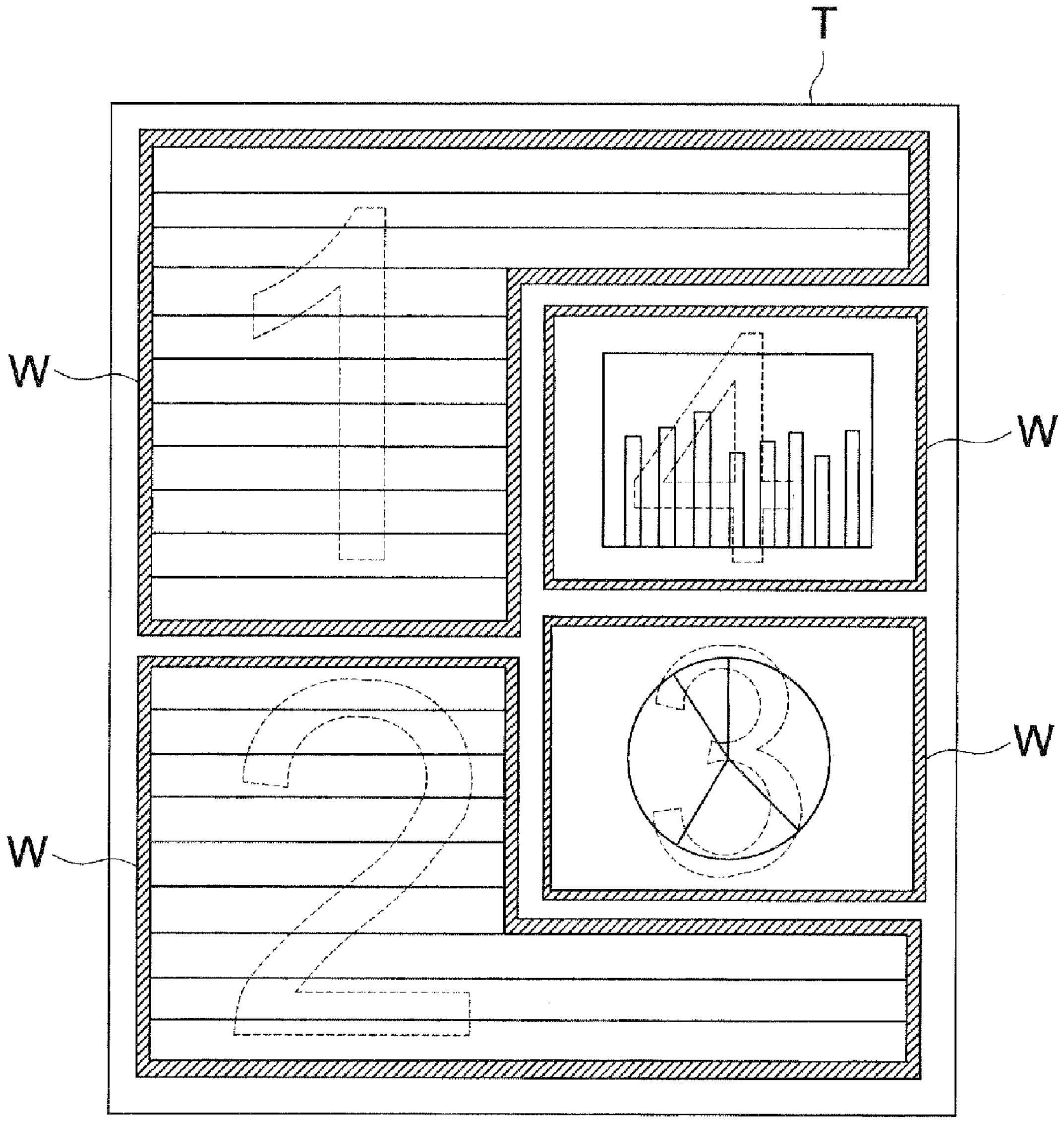
FIG. 8 is a schematic diagram showing an example of position information attached print data.

In FIG. 8, an example of the position information attached print data is shown.

As shown in FIG. 6, in original document data D, since the divided character data is arranged to be D1A and D1B, and the divided diagram data is arranged to be D2 and D3, each data area is enclosed with closing lines W as shown in FIG. 8, and further, by attaching the number of printing order determined for each data area in Step S7, the position information attached print data T is created. Namely, in this case the information of printing order number is the position information.

After the operations of Steps S8-S10, upon completion of creating the character print data, the diagram print data, and the position information attached print data, all the created character print data and diagram print data are displayed as thumbnails on operation/display section 106 (Step S11).

Figure 9:
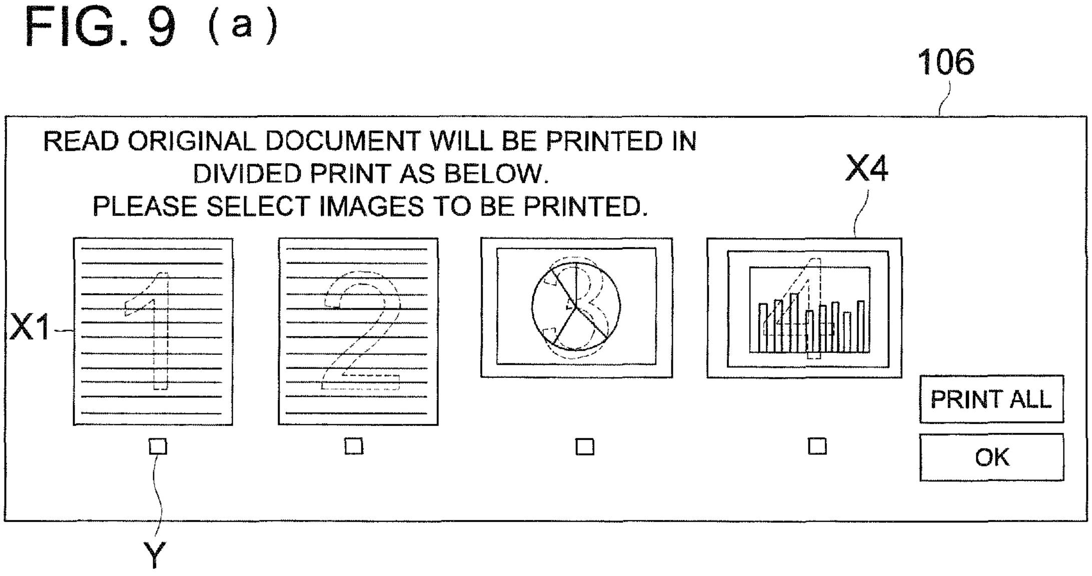
FIGS. 9(*a*)-(*b*) are schematic diagrams showing operation/display section 106 which displays character print data and diagram print data as thumbnails.
Figure 9:
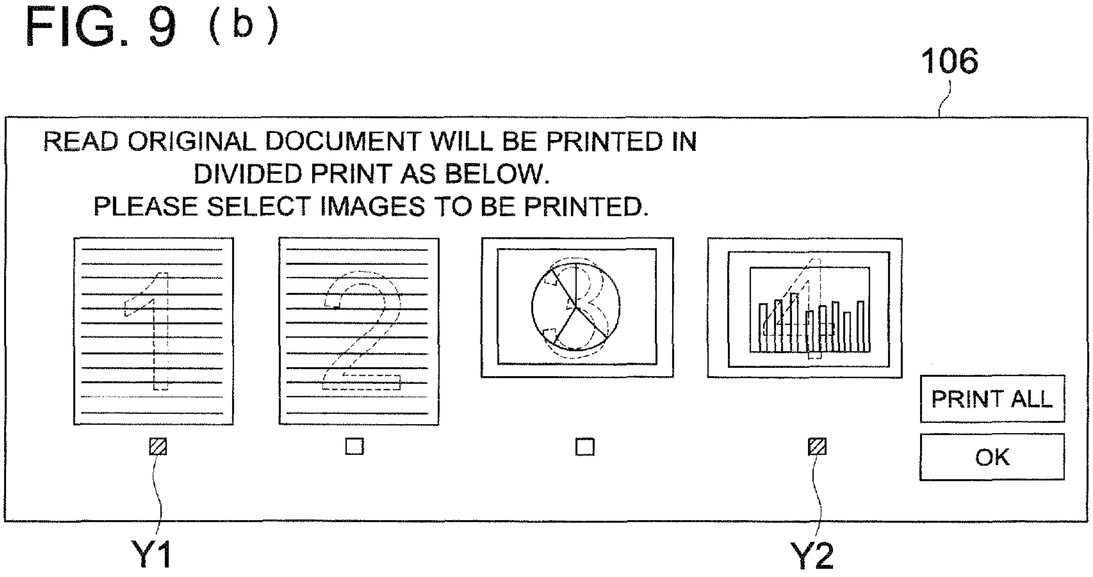

FIGS. 9(*a*)-(*b*) are a schematic diagram showing operation/display section 106 which displays character print data and diagram print data as thumbnails;

As shown in FIGS. 9(*a*)-(*b*), all the character print data and the diagram print data are thumbnail displayed, and the print data to be outputted on the sheet are selected through this setting screen.

A selection button Y is arranged under each print data display, and the print data requested to be printed on the sheet is selected by the selection button Y. For example, in a case where character print data X1 and diagram print data X4 are requested to be printed, selection buttons Y1 and Y2 are pressed. Then, the areas of the selection buttons are changed in color. In case of requiring all print data to be printed on the sheet, "PRINT ALL" button in right side is pressed.

After the character print data etc, are displayed as thumbnails on operation/display section 106, whether all the data are to be printed is determined (Step S12 in FIG. 4), and in the case of printing all (YES in Step S12), the position information attached print data and all the character print data/diagram data are printed (Step S13). Namely, four pieces of character print data/diagram print data shown in FIGS. 7(*a*)-(*d*), and one piece of position information attached print data shown in FIG. 8 are printed to output on 5 sheets. Since characters and diagram/tables are enlarged and printed on sheets, even an elderly people can easily recognize them.

Meanwhile, in cases where only the selected print data is requested to be printed on a sheet without printing all the data (NO in Step S12), it is determined whether output sheet size is to be changed (Step S14), and in case of no change, the position information attached print data and the selected character print data/diagram data are printed (Step S15). In case of changing the output sheet size, the position information attached print data and the selected character print data/diagram data are printed on the sheet of changed output size (Step S16). For example data are outputted on mixed sizes of A4 size and A3 size sheets, in this case.

As described above, by using the printing order number as the position information, the character print data and the diagram print data are enlarged/divided and printed on multiple sheets, each data being attached with respective position information (refer to FIG. 7). And further originally arranged original document data is attached with the position information and printed (refer to FIG. 8). Therefore, the positional relation between the characters/diagrams divided and outputted on multiple sheets, and originally arranged original document data are easily recognized.

Although, in the flow chart shown in FIGS. 3 and 4, the printing order number is used as the position information, the other information can be utilized for the position information.

Figure 10:
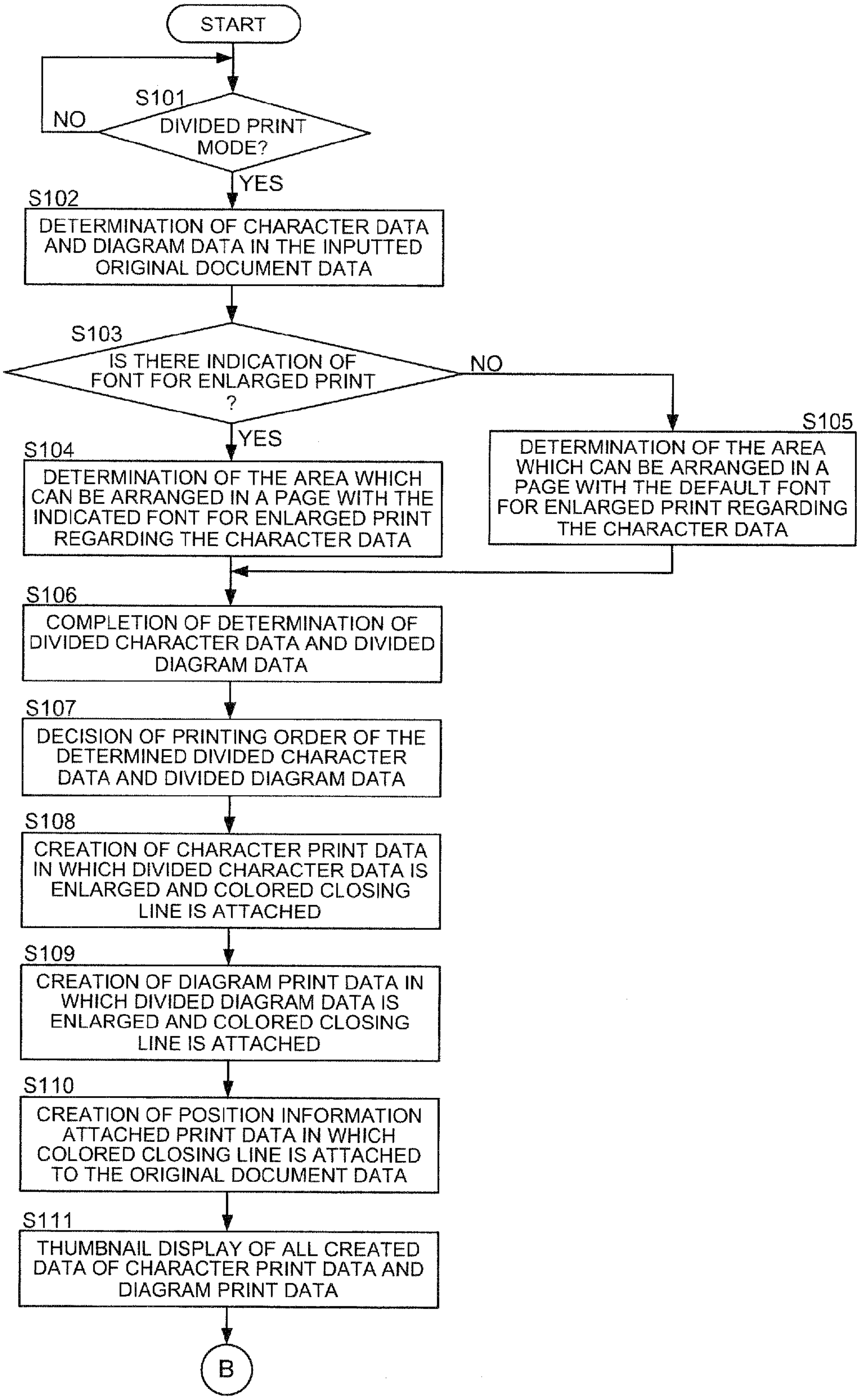
FIG. 10 is a flow chart showing an operation relating to another divided print mode.

FIG. 10 is a flow chart showing an operation relating to another divided print mode.

Figure 11:
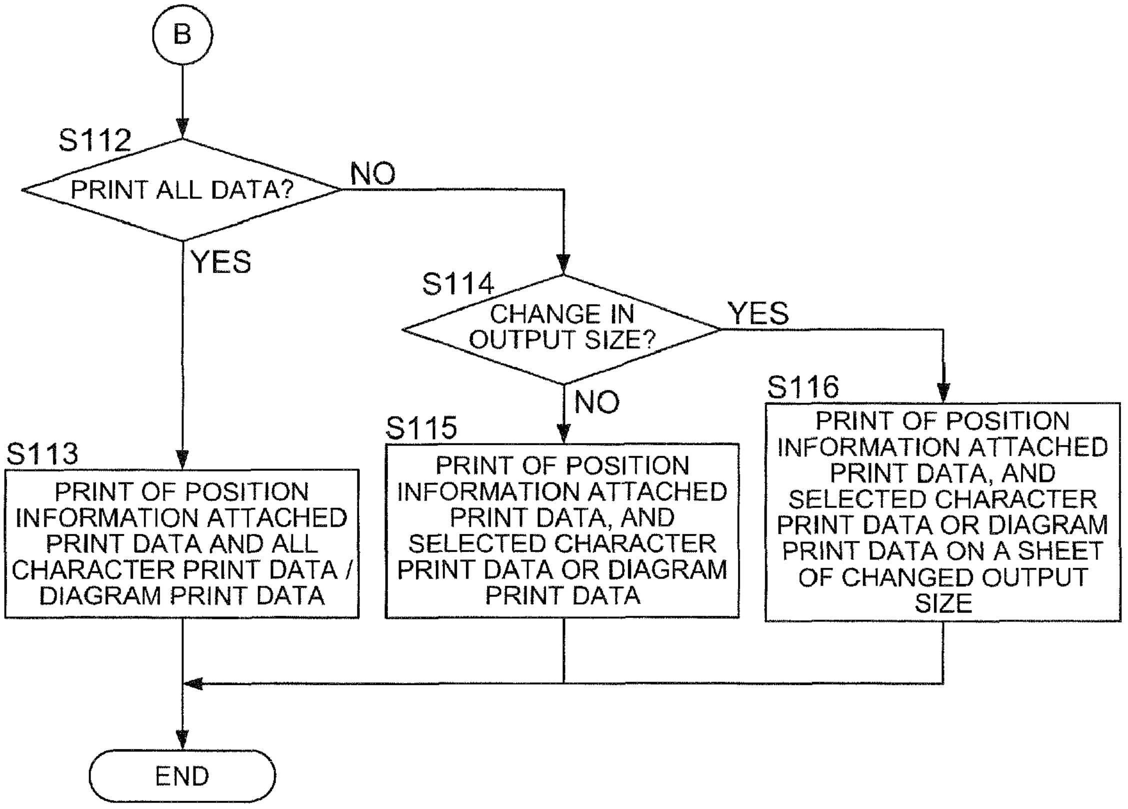
FIG. 11 is a flow chart showing an operation relating another divided print mode.

Although the flow chart shown in FIGS. 10 and 11 is basically same as the flow chart shown in FIGS. 3 and 4, in the flow chart of FIGS. 10 and 11 different colored closing line is attached to each of the character print data and the diagram print data to distinguish each position in the original document data. Namely, color information different for each of the character print data and the diagram print data is utilized as the position information.

Steps S101-S107 in FIG. 10 is same as steps S1-S7 in FIG. 3.

After the printing order is determined in Step S107 of FIG. 10, based on the determined printing order, print data to be outputted on the sheet are created by image processing section 107 in Steps S108-S110.

In Step S108, the divided character data is enlarged and the character print data attached with a colored closing line based on the printing order determined in Step S 107 is created. And in Step S109, the divided diagram data is enlarged and the diagram print data attached with a colored closing line based on the printing order determined in Step S 107 is created. In ROM 102 of image forming apparatus 1 a data table is stored in which the relation between printing order and color is specified, for example, red closing line and blue closing line are related to first and second printing order respectively, and by referring to the data table, a colored closing line with the color based on the printing order is attached to each print data.

Figure 12:
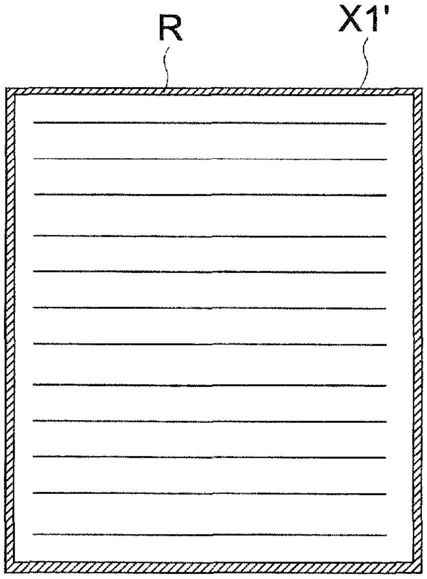
FIGS. 12(*a*)-(*d*) are schematic diagrams showing examples of character print data and diagram print data.
Figure 12:
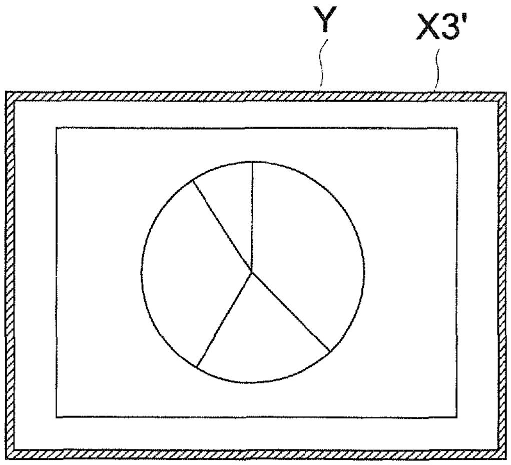
Figure 12:
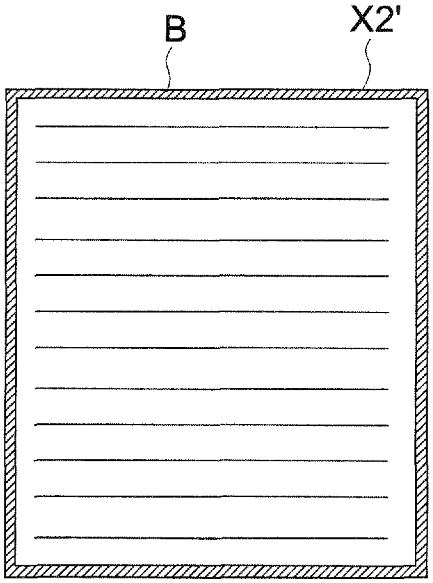
Figure 12:
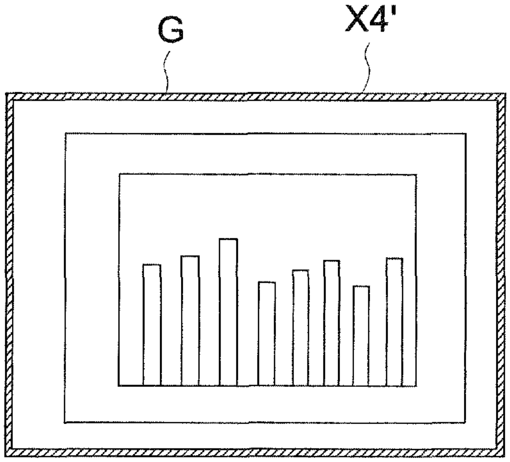

In FIG. 12, examples of character print data and diagram print data are shown.

Among the original document data D shown in FIG. 6, since divided character data D1A is firstly printed, the closing line R (Red) representing the first printing order is attached on character print data X1', which is based on divided character data D1A. To each character print data and diagram print data, attached is a different colored closing line. For example, to character print data X2', which is based on divided character data D1B, the second printing order color of B (Blue) closing line is attached at the circumference of the data, to diagram print data X3', which is based on divided diagram data D2, the third printing order color of Y (Yellow) closing line is attached at the circumference of the data, and to diagram print data X4', which is based on divided diagram data D3, the fourth printing order color of G (Green) closing line is attached at the circumference of the data.

After the creation of the character print data and the diagram print data, in Step S 110, position information attached print data is created in which colored closing lines are attached to the complex original document data.

Figure 13:
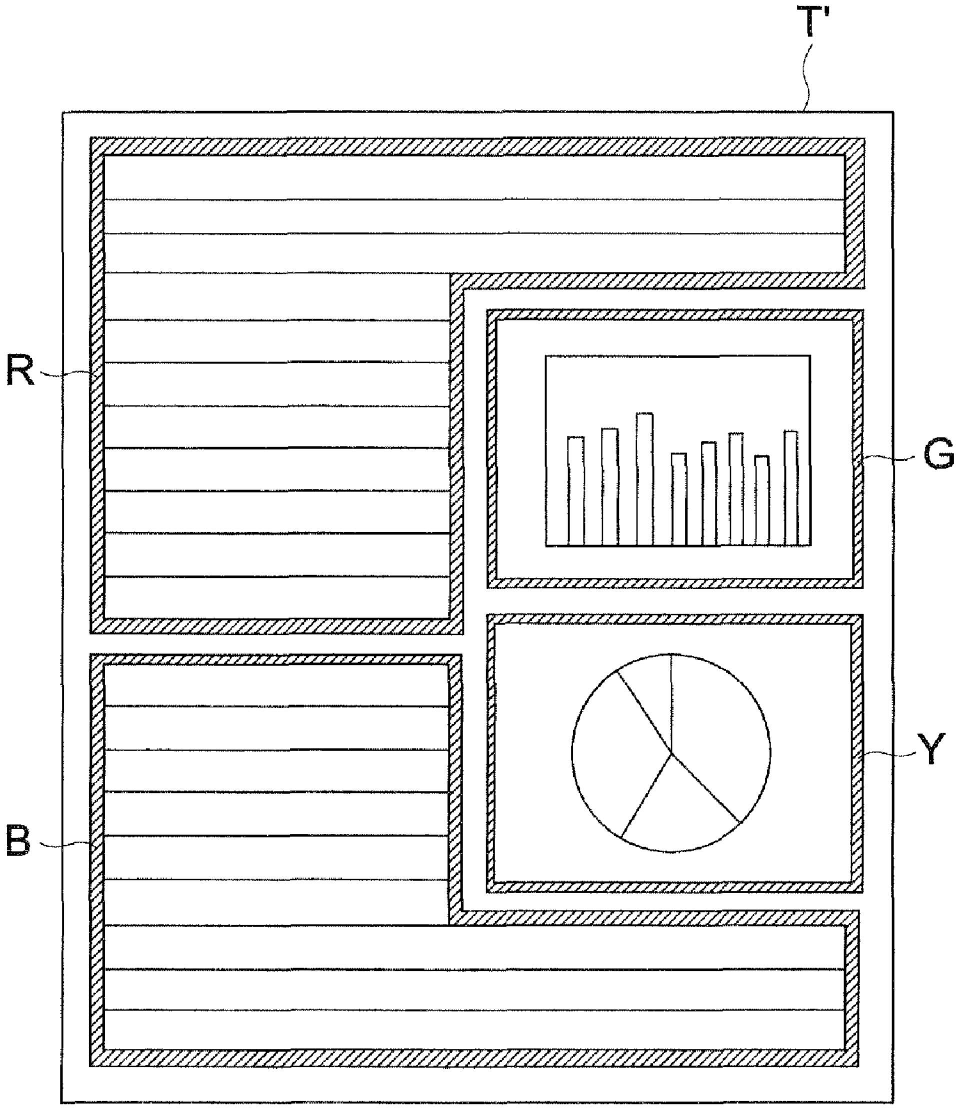
FIG. 13 is a schematic diagram showing an example of position information attached print data.

In FIG. 13, the position information attached print data is shown.

As shown in FIG. 6, in original document data D, since the divided character data is arranged to be D1A and D1B, and the divided diagram data is arranged to be D2 and D3, each data area is enclosed with different colored closing lines as shown in FIG. 13, to create the position information attached print data.

In this way, by utilizing different colored closing lines, the positional relation between the characters/diagrams divided and outputted on multiple sheets, and originally arranged original document data are easily recognized.

Although, in the above described embodiments, the printing order number and color information are used as the position information, the other information, with which each data position can be specified in the original document data, can be utilized for the position information.

The present invention is not restricted to the present embodiments, but modification or addition without departing from the spirit of the present invention can be included in the present invention.

What is claimed is:

1. An image forming apparatus for dividing image data of a single page of complex original document data which includes both character data and diagram data in the single page of data, enlarging the divided image data, and outputting the enlarged divided image data on a plurality of sheets respectively, the image forming apparatus comprising:

(i) an image processing section which creates print data to be outputted out of the complex original document data;

wherein the image processing section:

determines divided character data and divided diagram data in the complex original document data, to be outputted onto the plurality of sheets;

creates character print data by enlarging the divided character data and by attaching position information of the respective divided character data in the complex original document data;

creates diagram print data by enlarging the divided diagram data and by attaching position information of the respective divided diagram data in the complex original document data; and creates position information attached print data in which the respective position information of the divided character data and the respective position information of the divided diagram data are attached to the complex original document data in a single page of data; and (ii) an image forming section which outputs the created position information attached print data comprising the complex original document data attached with the respective position information of the divided character data and the divided diagram data onto one sheet from among the plurality of sheets, and outputs at least one of the created character print data comprising the enlarged divided character data attached with the respective position information or the created diagram print data comprising the enlarged divided diagram data attached with the respective position information on another sheet from among the plurality of sheets.

2. The image forming apparatus of claim 1, wherein the position information is number information which is made different between each of the character print data and the diagram print data.

3. The image forming apparatus of claim 1, wherein the position information is color information which is made different between each of the character print data and the diagram print data.

4. The image forming apparatus of claim 1, further comprising an operation/display section which displays the character print data and the diagram print data as thumbnails, wherein data from among the character print data and the diagram print data to be outputted onto sheets is selectable through the operation/display section.

5. A data processing method for dividing image data of a single page of complex original document data which includes both character data and diagram data in the single page of data, enlarging the divided image data, and outputting the enlarged divided image data on a plurality of sheets respectively, the data processing method comprising:

determining divided character data and divided diagram data in the complex original document data, to be outputted onto the plurality of sheets;

creating character print data by enlarging the divided character data and by attaching position information of the respective divided character data in the complex original document data;

creating diagram print data by enlarging the divided diagram data and by attaching position information of the respective divided diagram data in the complex original document data;

creating position information attached print data in which the respective position information of the divided character data and the respective position information of the divided diagram data are attached to the complex original document data in a single page of data; and outputting the created position information attached print data comprising the complex original document data attached with the respective position information of the divided character data and the divided diagram data on one sheet from among the plurality of sheets, and outputting at least one of the created character print data comprising the enlarged divided character data attached with the respective position information or the created diagram print data comprising the enlarged divided diagram data attached with the respective position information on another sheet from among the plurality of sheets.

6. The data processing method of claim 5, wherein the position information is number information which is made different between each of the character print data and the diagram print data.

7. The data processing method of claim 5, wherein the position information is color information which is made different between each of the character print data and the diagram print data.

8. The data processing method of claim 5, further comprising displaying the character print data and the diagram print data as thumbnails on an operation/display section, wherein data from among the displayed character print data and the diagram print data to be outputted onto sheets is selectable through the operation/display section.

9. The data processing method of claim 5, further comprising:

determining whether there is an indication of a font size for enlarged print;

when it is determined that there is the indication of the font size for enlarged print, determining the divided character data in the complex original document data in accordance with the indicated font size for enlarged print; and when it is determined that there is no indication of the font size for enlarged print, determining the divided character data in the complex original document data in accordance with a default font size for enlarged print.

10. The data processing method of claim 5, further comprising:

determining a printing order of the determined divided character data and the divided diagram data; and attaching the respective position information of the divided character data and the respective position information of the divided diagram data in accordance with the determined printing order.

11. The image forming apparatus of claim 1, wherein the image processing section determines whether there is an indication of a font size for enlarged print, and wherein:

when it is determined that there is the indication of the font size for enlarged print, the image processing section determines the divided character data in the complex original document data in accordance with the indicated font size for enlarged print, and when it is determined that there is no indication of the font size for enlarged print, the image processing section determines the divided character data in the complex original document data in accordance with a default font size for enlarged print.

12. The image forming apparatus of claim 1, wherein the image processing section determines a printing order of the determined divided character data and the divided diagram data, and attaches the respective position information of the divided character data and the respective position information of the divided diagram data in accordance with the determined printing order.

* * * * *